United States Patent [19]
Ford et al.

[11] 3,982,723
[45] Sept. 28, 1976

[54] PINCH VALVE AND METHOD FOR FABRICATION

[75] Inventors: Freeman A. Ford, Atherton; Richard O. Rhodes, San Francisco, both of Calif.

[73] Assignee: Fafco Incorporated, Menlo Park, Calif.

[22] Filed: Mar. 28, 1974

[21] Appl. No.: 455,869

[52] U.S. Cl. .............................. 251/5; 29/157.1 R; 29/450; 29/455 R; 285/55; 285/236
[51] Int. Cl.² .................... F16K 7/07; F16L 21/06
[58] Field of Search ....................... 251/4–10, 251/61.1; 29/157.1, 455, 450; 285/45, 55, 236

[56] References Cited
UNITED STATES PATENTS

| | | | |
|---|---|---|---|
| 2,604,246 | 7/1952 | Hood | 251/5 |
| 3,203,662 | 8/1965 | Lau | 251/5 |
| 3,402,946 | 9/1968 | Dedian | 285/236 |

FOREIGN PATENTS OR APPLICATIONS

| | | | |
|---|---|---|---|
| 6,411,144 | 3/1965 | Netherlands | 251/5 |

Primary Examiner—Martin P. Schwadron
Assistant Examiner—Richard Gerard
Attorney, Agent, or Firm—Flehr, Hohbach, Test, Albritton & Herbert

[57] ABSTRACT

A valve body having a circular cylindrical shape may be made of plastic or any other suitable material. A radial hole through the wall of the body has a pressure inlet fitting positioned therein. A flexible tubing is passed through the body co-axial therewith. The tubing is folded back to overlie the ends of the valve body and a valve end tube is positioned to overlie the folded back ends of the flexible tubing. Clamps are utilized to impart inward radial pressure about the circumference of the valve end tube overlying the folded back tubing. The valve end tube is adapted to receive the ends of an inlet and an outlet flow conduit. Pressure of varying magnitude introduced through the pressure inlet fitting serves to meter the fluid flow through the conduit from a full flow to substantially zero flow as the flexible tube distends into the passage through the valve body.

3 Claims, 5 Drawing Figures

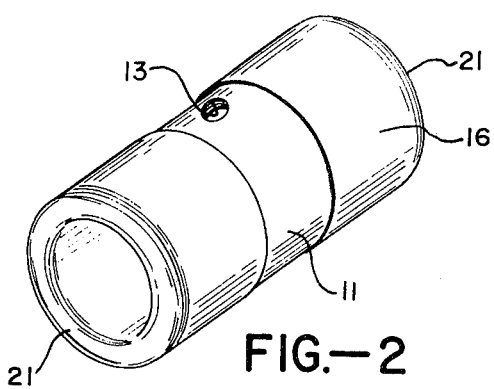
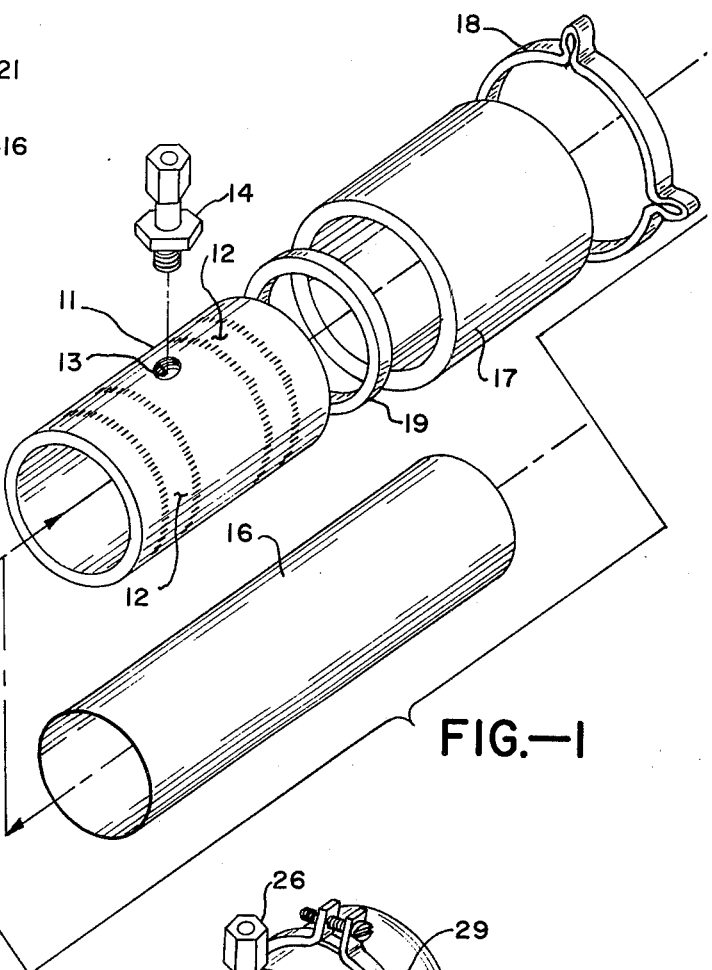
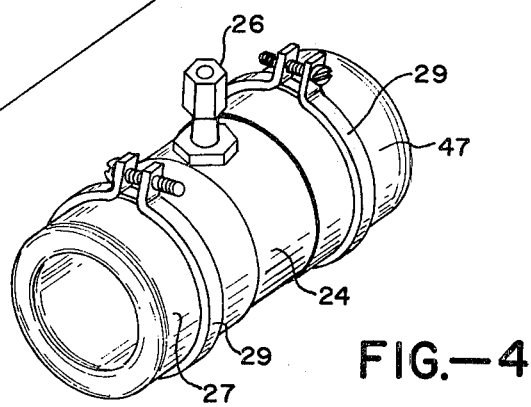
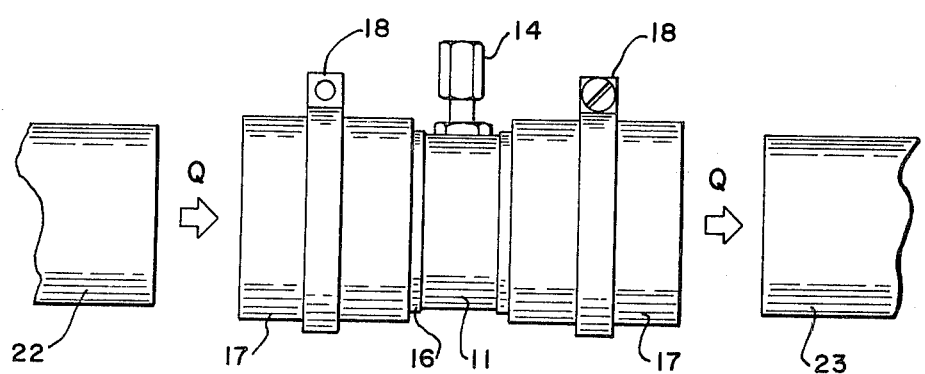
FIG.—2
FIG.—1
FIG.—4
FIG.—3

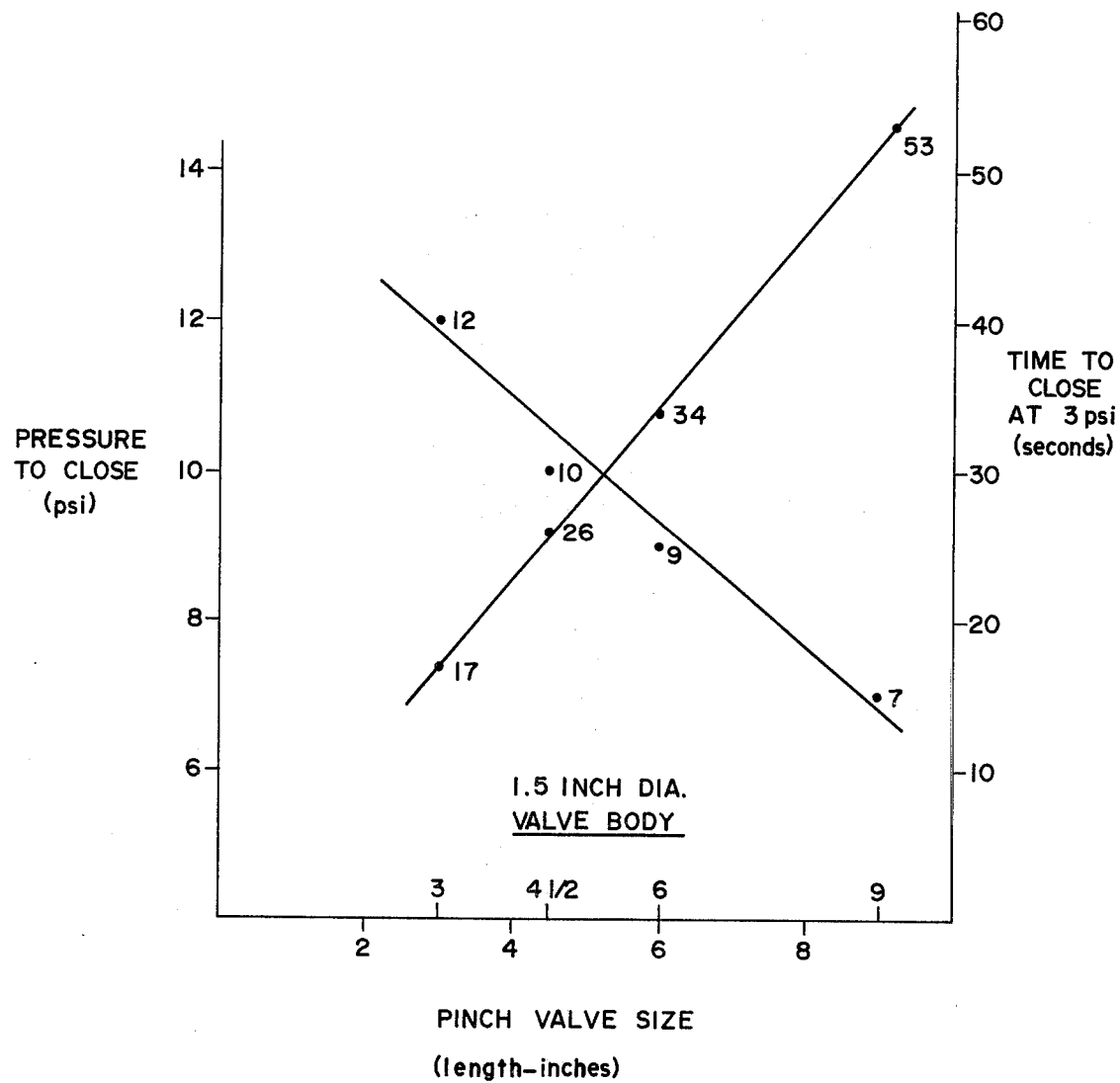
FIG.—5

PINCH VALVE AND METHOD FOR FABRICATION

BACKGROUND OF THE INVENTION

1. Field of the invention.

This invention relates to a valve for pinching off flow through a fluid conduit, and more particularly to a valve which utilizes a control pressure for controlling flow rate through the conduit and a method for fabricating the valve.

2. Description of the prior art.

Many types of valves exist for controlling fluid flow through a conduit. Valves such as globe valves or gate valves require precision fitting parts and seals between the inside of the valve and the exterior of the valve where the valve control passes through the valve body. The precision parts in such valves are often subjected to wear due to abrasive characteristics which may exist in the flowing medium. Where such flow characteristics exist, and/or where flow pressures are not too high, pinch type valves are known which utilize external pressures for distending a flexible internal member until it blocks the flow channel. Known pinch type valves exhibit frequent failure due to separation in the flexible member caused by pressure applied to the flexible member to obtain the necessary valve seals. Elaborate mechanisms have been required in the past to obtain the valve seals for proper flow control.

A valve is needed for use in controlling flow of any type of medium, which is not susceptible to internal precision part wear, which exhibits substantially no head loss across the valve, which provides a positive and durable seal between the flowing medium and the exterior of the valve, and which is of a construction readily adapted to an efficient method of fabrication utilizing inexpensive and readily available materials.

SUMMARY AND OBJECTS OF THE INVENTION

In general the pinch valve disclosed herein is adapted for positioning between inlet and outlet sections of flow conduit and includes a valve body which is cylindrical in shape having a thin rigid wall with a centrally located opening therethrough for admitting valve control pressures. A flexible tube extends axially through the valve body to form a flow passage through the valve and folds back over the ends of the valve body to overlie the outside diameter near each end. A valve end tube overlies the folded back flexible tube on each end of the valve body. The valve end tube is adapted to surround the ends of the inlet and outlet conduit sections. Clamps are disposed around the valve end tube over each end of the valve body for applying inward pressure to secure the pinch valve to the ends of the inlet and outlet conduit sections and to force the flexible tube against the outside diameter of the valve body. A sealed valve chamber is formed between the inside diameter of the valve body and the flexible tube. The flow passage through the valve assumes a cross-sectional area which diminishes as valve control pressure is increased.

The method includes cutting a length of rigid conduit having a cylindrical form. Inserting a distendable tube member axially through the length of conduit and folding it back over the ends thereof, combined with mounting a valve end tube over the folded back ends and applying inward radial pressure over the portions of the valve end tube which overlie the folded back ends provides a sealed valve chamber between the inside diameter of the length of conduit and the distendable tube. Admitting more or less pressure into the valve chamber from the exterior of the valve provides the desired blockage of the passage through the length of rigid conduit as the tube is caused to distend inwardly by the pressure.

It is an object of the present invention to provide a pinch valve which will not be damaged by the means for providing a durable seal between the valve chamber and the exterior of valve.

It is another object of the present invention to provide a pinch valve which may be used to regulate any flow medium regardless of abrasive flow characteristics.

It is another object of the present invention to provide a pinch valve in which closing action may be enhanced by the effect of the flowing medium.

It is another object of the present invention to provide a pinch valve which removes the probability of leakage of the flowing medium from the valve chamber to the exterior of the valve.

It is another object of the present invention to provide a method of fabrication for a pinched valve which utilizes inexpensive easily attainable non-precision parts.

It is another object of the present invention to provide a method for fabricating a pinch valve which utilizes the least number of steps which are easily performed by hand or the simplest automated equipment.

Additional objects and features of the invention will appear from the following description in which the preferred embodiment has been set forth in detail in conjunction with the accompanying drawings.

BRIEF DESCRIPTION OF THE DRAWINGS

FIG. 1 is an exploded isometric view of one embodiment of the pinch valve assembly.

FIG. 2 is an isometric view of the valve body and flexible tubing assembly.

FIG. 3 is a side elevational view of the pinch valve assembly of FIG. 1.

FIG. 4 is an isometric view of another embodiment of the pinch valve assembly.

FIG. 5 is a graph of typical pinch valve operating characteristics.

DESCRIPTION OF THE PREFERRED EMBODIMENTS

The pinch valve assembly and method disclosed herein provides the most efficient use of simple component parts shapes and assembly methods and makes it possible for use of the widest variety of easily obtainable materials for use in the assembly and method for fabrication. Referring to FIG. 1 a valve body 11 is seen taking the shape of a thin walled circular cylinder and having disturbed or upset areas 12 surrounding the outside diameter near the ends of the body 11. A hole 13 is located centrally between the ends of valve body 11 extending radially through the wall thereof. A pressure inlet fitting 14 is formed to fit sealably in hole 13.

FIG. 1 also shows a thin wall flexible tubing 16 which, when assembled in the valve, extends axially through the inside diameter of valve body 11. As seen in FIG. 2 flexible tubing 16 is longer than the length of valve body 11 and is folded back over the ends of body 11 to overlie the disturbed areas 12 while leaving access to radial hole 13.

In this embodiment valve end tubes 17 are passed over the outside diameter of valve body 11 surrounding the ends of body 11 where flexible tube 16 overlies disturbed areas 12. Expansion clamps 18 are placed on the outside diameter of valve end tubes 17 and adjustably reduced in diameter to provide omnidirectional inward pressure for forcing flexible tube 16 into intimate contact with disturbed areas 12 on the outside diameter of valve body 11. Valve end gaskets 19 have an outside diameter similar to the inside diameter of valve end tubes 17 and are placed therein to abut a folded edge 21, seen in FIG. 2, on flexible tube 16 produced when flexible tube 16 is folded back over the outside diameter of valve body 11.

Turning now to the operation of the embodiment just described reference is made to FIG. 3. The pinch valve assembly of FIG. 1 may be inserted between an inlet conduit 22 and an outlet conduit 23 which conducts a fluid flow therethrough. Valve end tubes 17 are adapted to surround the outside diameters of conduit sections 22 and 23, but it may be readily seen that in some applications conduit sections 22 and 23 could surround the outside diameter of valve end tube 17. The axial spacing of the expansion clamps 18 relative to the ends of the inlet and outlet conduit sections 22 and 23 surrounded by the end tubes 17 is such that upon the clamps being further tightened the ends of the conduit sections are secured therein spaced apart by at least the length of the valve body 11. In this embodiment valve end gaskets 19 protect the folded edge 21 of flexible tube 16 from the ends of inlet and outlet conduit sections 22 and 23 respectively. It may be seen that pressure applied toward the valve assembly by the conduit sections 22 and 23 is thereby prevented from having a damaging effect on folded edge 21 by the buffering action of the valve end gaskets 19.

When pressure is admitted through pressure inlet fitting 14 it is contained in a chamber formed between the inside diameter of valve body 11 and the outside diameter of flexible tube 16. The seal provided by the inward pressure exerted by expansion clamps 18 and by the seal about the base of pressure inlet fitting 14 creates a sealed valve chamber. Pressure admitted into the sealed valve chamber through pressure inlet fitting 14 causes the flexible tubing 16 to distend, diminishing the cross section of the flow path through the inside diameter of flexible tube 16. Upon the introduction of a sufficient pressure level to the valve chamber, flexible tubing 16 distends to a point where diametrically opposite inside walls contact, thereby completely closing the passage through the valve and blocking the flow Q through the conduit sections 22 and 23. The venturi effect of the flow through flexible tube 16 enhances distension of the tube.

Referring to FIG. 5 typical operating characteristics of the pinch valve disclosed herein are shown. On the left-hand ordinate the force required to completely close the pinch valve substantially immediately is shown in pounds per square inch. On the right-hand ordinate the time to complete valve closure is shown in seconds at a pressure to the pressure inlet fitting 14 of three pounds per square inch. The abcissa is graduated in pinch valve length in inches. As may be seen the relationships are linear with the valve length being inversely proportional to the required closing pressure in pounds per square inch and directly proportional to the closing time in seconds at a constant closing pressure. The valve inside diameter is chosen to be similar in size to the inside diameter of the inlet and outlet conduit sections 22 and 23, respectively, to minimize head loss across the valve. A valve having a 6 inch long valve body 11, one and a half inches in diameter for example would fully close substantially immediately with a 9-pound per square inch pressure introduced through pressure inlet fitting 14. The same valve would close with 3 pounds per square inch introduced through pressure inlet fitting 14 in 34 seconds.

The manner in which the pinch valve assembly in FIG. 3 is constructed includes cutting the valve body 11 to a predetermined length and disturbing the outside diameter throughout the entire circumference of valve body 11 near the ends thereof in the areas indicated by the item number 12. Insertion into valve body 11 of a flexible tubing section 16 which is longer than the length of valve body 11 is made as indicated by the arrows of FIG. 1. The ends of flexible tubing 16 are folded back over the ends of valve body 11 to overlie the upset or disturbed areas 12. Means are then assembled for exerting inward radial pressure on the portions of flexible tubing 16 which overlie disturbed areas 12 for forcing the flexible tubing 16 into intimate contact with the outside diameter of valve body 11. This extrusion creates a positive seal between flexible tubing 16 and the valve body 11 at the disturbed areas 12 providing a sealed valve chamber between the inside diameter of valve body 11 and the flexible tubing 16. Introduction of positive pressure through pressure inlet fitting 14 positioned in radial hole 13 causes flexible tubing 16 to distend inwardly to decrease the cross-sectional area in the path through the valve.

A wide variety of materials may be used in the structure of the valve shown in FIGS. 1 and 3. For example, valve body 11 may be made of a rigid plastic material and the disturbed area 12 may be formed by any means such as knurling, local heat application, or chemical means for example. Flexible tubing 16 may be of any rubber-like material which is compatible with the flowing medium. Valve end tubes 17 may be of a rubberized fabric material having appropriate lengths, and expansion clamp 18 may be of any available type which may apply an adjustable inwardly directed radial pressure to the valve end tubes 17 when overlying the disturbed areas 12. Valve end gaskets 19 may be of any plastic, rubber-like or cork material for protecting folded edges 21 on flexible tubing 16. It is thus seen that inexpensive readily available materials are usable for each component part of the pinch valve disclosed herein.

FIG. 4 shows an alternate embodiment of the pinch valve. A valve body 24 similar to valve body 11 is shown having a pressure inlet fitting 26 similar to fitting 14 sealably fitted into an opening through the wall of valve body 24. A length of flexible tubing 27 which is longer than the axial length of valve body 24 is drawn through the inside diameter of valve body 24. The body 24 has upset or disturbed areas 28 covering the outside diameter near the ends thereof. Flexible tubing 27 is folded back over the outside diameter of valve body 24 to overlie the disturbed areas on each end. An expansion clamp 29 is placed around the portions of flexible tubing 27 which overlies disturbed areas 28 to exert omnidirectional inward force on flexible tubing 27 to bring the surfaces of flexible tube 27 and the outside diameter of valve body 24 into intimate contact.

The inwardly directed force about the entire circumference of flexible tubing 27 exerted by expansion clamps 29 causes flexible tubing 27 to extend into the irregular surface defined by disturbed areas 28, thus affording a positive seal therebetween. Pressure inlet fitting 26 provides an inlet path to a sealed valve chamber defined by the inside diameter of valve body 24 and flexible tubing 27. The valve assembly shown in FIG. 4 may have end portions at the inside diameter thereof adapted to surround the outside diameter of inlet and outlet conduit sections similar to sections 22 and 23 described above. The ends of the inlet and outlet conduit sections may be spaced at a predetermined distance by means external to the pinch valve assembly of FIG. 4 so that a sufficient length of flexible tubing 27 is available to distend inwardly upon application of pressure through pressure inlet fitting 26 to provide a metering function.

The materials of the pinch valve of FIG. 4, as described above, may be of readily available inexpensive materials, which are easily formed and which lend themselves to the unique method for forming a pinch valve assembly described herein. The operation of the pinch valve assembly of FIG. 4 is similar in all respects to that described for the pinch valve assembly of FIG. 3 and follows the characteristics shown in FIG. 5.

A pinch valve assembly has been disclosed which is capable of passing any fowing medium without degradation of valving or metering characteristics. There are no leakage paths available between the flowing medium and the valve actuating mechanism. A minimal head-loss occurs across the pinch valve assembly of this disclosure due to the fact that the inside diameter of the valve is substantially the same as the inside diameter of the flow conduit in the preferred embodiment. The pinch valve assembly is assisted in closing due to the venturi effect of the flow as the flexible tube distends. A method of fabrication is also disclosed which facilitates assembly and formation of component parts as well as utilization of a wide variety of materials for fabrication of the component parts.

We claim:

1. A valve assembly for placement between the ends of inlet and outlet conduit sections for controlling flow of a fluid therethrough, comprising a valve body having an inner and an outer surface defining a cylindrical wall, a flexible tube extending axially through and having a length longer than said valve body so that said flexible tube may be folded back over the ends of said valve body to overlie the outer surface of said cylindrical wall at the ends thereof, a valve end tube for surrounding said flexible tube where it overlies the outer surface on each end of said valve body, and an expansion clamp surrounding said valve end tube at each end of said valve body for applying inwardly directed radial pressure on said valve end tube when tightened, said valve end tube being deformable and adapted to surround the ends of the inlet and outlet conduit sections so that when radial pressure is applied inwardly on said valve end tube a seal is formed between said valve body and said flexible tube, and the axial spacing of the clamps relative to the ends of the inlet and outlet conduit sections surrounded by said valve end tube being such that upon said expansion clamps being further tightened, the ends of the conduit sections are secured therein spaced apart by at least the length of said valve body, said flexible tube and the inner surface of said valve body cooperating to form a sealed valve chamber therebetween, said valve body having an opening through said cylindrical wall for admitting pressure into said sealed valve chamber, whereby pressure directed through said opening meters the fluid flow from full flow to substantially zero flow as pressure rises and said flexible tube distends into and blocks flow through said valve body.

2. A valve assembly for placement between the ends of inlet and outlet conduit sections for controlling flow of a fluid therethrough, comprising a valve body having an inner and an outer surface defining a cylindrical wall, a flexible tube extending axially through and having a length longer than said valve body, said flexible tube being folded back over the ends of said valve body to overlie the outer surface of said cylindrical wall at the ends thereof, a valve end tube for surrounding said flexible tube where it overlies the outer surface on each end of said valve body, a valve end gasket positioned at each end of the valve assembly for contacting the ends of the inlet and outlet conduit sections, whereby said flexible tube is protected from damage by axial pressure exerted by the inlet and outlet conduit sections on said flexible tube where it is folded over the ends of said valve body, and an expansion clamp surrounding said valve end tube at each end of said valve body for applying inwardly directed radial pressure on said valve end tube when tightened, said valve end tube being deformable by the inwardly directed radial pressure and being adapted to surround the end of the inlet and outlet conduit sections, so that the inwardly directed radial pressure on said valve end tube forms a seal between said valve body and said flexible tube, said flexible tube and the inner surface of said valve body cooperating to form a sealed chamber therebetween, said valve body having an opening through said cylindrical wall for admitting pressure into said sealed valve chamber, whereby pressure directed through said opening meters the fluid flow from full flow to substantially zero flow as the pressure in said sealed valve chamber increases and said flexible tube distends into and inhibits flow through said valve body.

3. A method for forming a valve for controlling flow of a fluid through a flow path including a conduit having a separation therein for receiving the valve, comprising the steps of cutting a length of conduit, extending a flexible tube axially through the length of conduit, folding the ends of the flexible tube in reverse direction to overlie the outside of the length of conduit at each end thereof, surrounding each end of the length of conduit and the folded ends of the flexible tube overlying the ends thereof with an end tube adapted to engage the conduit on each side of the separation therein, and deforming the end tube by applying inward clamping pressure on the outside of the end tube to secure the end tube to each end of the length of conduit and to the conduit on each side of the separation therein, and to form a seal between the ends of the flexible tube and the outside of the length of conduit at the ends thereof, so that when a pressure is introduced into the space between the inside of the length of conduit and the flexible tube running therethrough, the flexible tube distends toward the center of the length of conduit for a distance responsive to the pressure magnitude thereby diminishing the cross section of the flow path through the inside diameter of the flexible tube.

* * * * *